United States Patent [19]

Coquillart

[11] 4,420,875

[45] Dec. 20, 1983

[54] METHOD OF MOUNTING AND CASTING A FLAT ROTOR

[75] Inventor: Michel Coquillart, Saint Etienne Terrenoire, France

[73] Assignee: Mavilor Systemes, Switzerland

[21] Appl. No.: 209,295

[22] Filed: Nov. 21, 1980

[30] Foreign Application Priority Data

Dec. 5, 1979 [FR] France .................................. 79 30269

[51] Int. Cl.³ ....................... H01R 43/08; H02K 15/02
[52] U.S. Cl. .......................................... 29/597; 29/598; 310/43; 310/237; 310/268
[58] Field of Search ................... 29/597, 598; 310/237, 310/266, 268, 43

[56] References Cited

U.S. PATENT DOCUMENTS

| 3,599,325 | 8/1971 | Burr et al. | 29/597 |
| 3,705,997 | 12/1972 | Baucle et al. | 310/237 |
| 3,863,336 | 2/1975 | Noto et al. | 29/597 |
| 3,925,881 | 12/1975 | Bowcott | 29/597 |
| 4,164,675 | 8/1979 | Sato et al. | 310/268 |

FOREIGN PATENT DOCUMENTS 706766 4/1954 United Kingdom .................. 29/597

Primary Examiner—Carl E. Hall
Attorney, Agent, or Firm—Eric P. Schellin

[57] ABSTRACT

An electric motor rotor assembly and method of forming the flat rotor wherein an inner tubular casing and a commutator are molded in a first mold thereby forming between the casing and the commutator a molded resin intermediate section. After the so molded commutator is removed from the first mold, the windings for the rotor are first cold crimped and then hot crimped to the commutator thereby breaking the insulation and providing a good electrical connection. After the windings are attached to the commutator, it can then be tested to check the windings for electrical continuity. After the testing, the assembly is placed into a second mold where resin is injected about the windings forming a resin enclosing sheath.

1 Claim, 3 Drawing Figures

METHOD OF MOUNTING AND CASTING A FLAT ROTOR

BACKGROUND OF THE INVENTION

The invention relates to a method and means of mounting and molding rotors for electric motors, and to the rotors obtained according to this method.

SUMMARY OF THE INVENTION

The object of the invention relates to the technical field of machines and electric motors, more particularly motors with flat rotors, rotors in the form of a disc, or conical rotors of various shapes.

According to the invention the aim was to rationalize and make profitable the production of rotors, more particularly flat or disc-shaped rotors, for electric motors, also to enable the winding to be checked before the final completion of the rotor and to ensure directly adequate orientation of the coils relative to the commutator.

In order to achieve this a method is used which is characterized by the fact that the inner tubular casing of the rotor and the commutator are positioned angularly in a mold suitable resin is poured between the said tubular casing and the commutator, the winding is joined and crimped on the commutator coil by coil, the segments of the commutator are separates and, thus formed, the unit is positioned angularly in a second mold into which a resin is also poured in order to coat the winding.

These and other characteristics will be seen in the following description.

BRIEF DESCRIPTION OF THE DRAWINGS

In order to establish the object of the invention without, however, limiting it, in the attached drawing.

DETAILED DESCRIPTION OF THE PREFERRED EMBODIMENT

Figure 1:
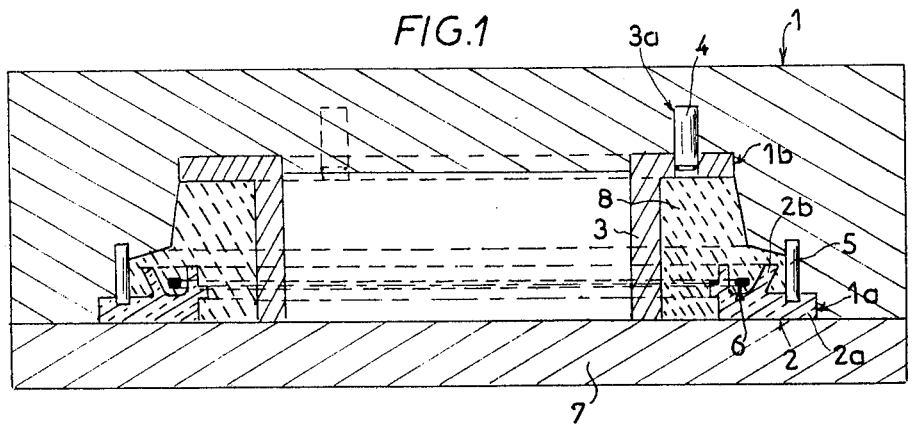
FIG. 1 shows a sectional view illustrating the first phase of the mounting and molding of the rotor.

In order to make the object of invention more tangible, it is now described by means of a non-limiting embodiment illustrated in the Figures of the drawing.

FIG. 1 shows a mold 1 having a hollow section 1a for receiving the external span 2a of the commutator 2 and an annular hollow section 1b for receiving the internal tubular casing 3 of the rotor receiving the motor shaft at the time of mounting, which is indexed in the mold through the intermediary of at least one pin or finger 4 integral with the mold and passing through an opening 3a of the tubular casing. In general, three regularly spaced pins or fingers 4 are provided to index the tubular casing in the mold 1.

The commutator 2 is also indexed in the mold relative to the pins 4, by one or more (usually three) pins or fingers 5 integral with the mold and interposed between the segments of the commutator.

Located in the groove 2b made in the inner surface of the commutator after molding is a ring 6 for the reinforcement of the said commutator, this ring being coated with impregnated glass fibres for easy adherence to the molding product.

A resin known commercially under the name of Araldite, or another product having adequate mechanical and electrical properties is then poured into the annular space formed by the commutator, a mold cover 7, the tubular casing and the wall of the mold. The molded resin forms molded resin intermediate section 8 that rigidly joins commutator 2 and tubular casing 3.

This resin 8 is preferably charged with heat conducting elements such as carbon to facilitate the removal of the calories emitted at right angles with the commutator to the motor shaft when the motor is in use.

Figure 2:
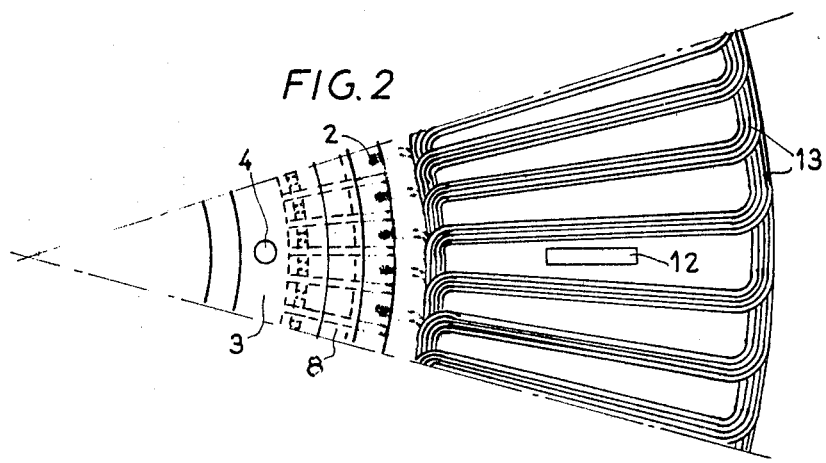
FIG. 2 is a partial plan view illustrating the mounting of the winding on the commutator.

The unit of tubular casing and commutator is then removed from the mold so that the winding 13 can be joined coil by coil to the pre-mold commutator (FIG. 2).

This joining is carried out in two stages, i.e. by cold crimping with the aid of a riveting hammer or similar device and then by hot crimping under high pressure with the aid of a crimping machine, so that the insulating material covering the wires cracks at the point of crimping in order to ensure a good electrical connection without necessitating cleaning the wires chemically or mechanically and low temperature-type soldering.

The unit is then machined in order to separate the segments of the commutator, as is well known in the art, and at this stage the said unit may then be connected to a checking device or testing machine for rotors so that any possible fault in electrical continuity may be detected.

Figure 3:
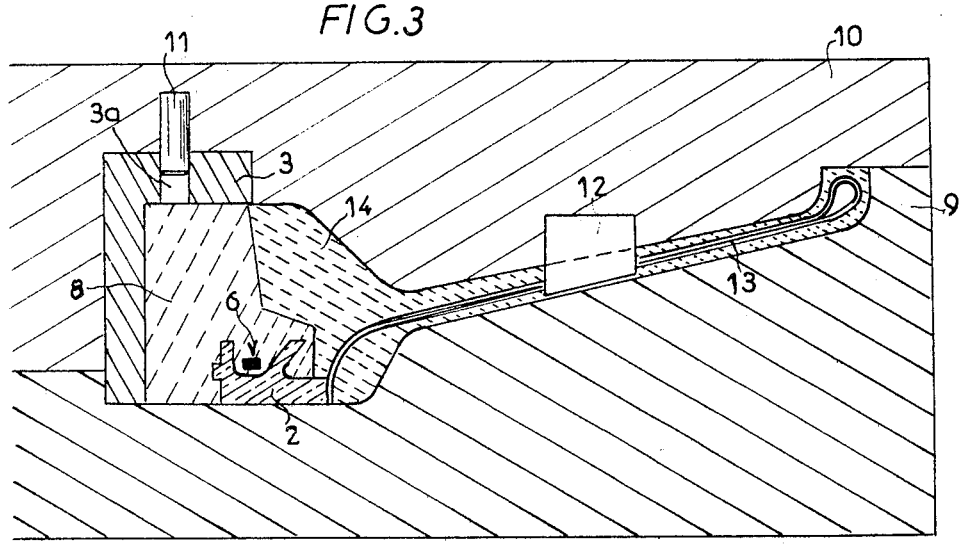
FIG. 3 is a partial sectional view illustrating the second phase of the molding of the rotor.

The unit is then positioned in a second mold (FIG. 3) comprising for this purpose a lower portion 9 shaped to receive the unit of winding, tubular casing and commutator in its natural position, and an upper portion 10 which is brought to fit exactly the opposed cross section of the unit, and having on the one hand one or more pins 11 or fingers for indexation of the tubular casing as in the first mold and, on the other hand, one or more wedges 12 intended for the angular indexing of the turns of the winding relative to the pins 11, as illustrated in broken lines in FIG. 2. A resin 14 similar to that used in the first phase is introduced around the winding and against the resin 8 in order to complete the rotor. Resin 14 therein forms a resin sheath molded around windings 13.

Thereby, by means of the relative orientations of the winding in respect of the tubular casing, this tubular casing being orientated at the first mold in respect of the segments of the commutator, the final orientation of the coils is made in respect of the segments of the commutator. This automatically ensures correct adjustment of the commutation without necessitating an angularly adjustable brush-holder and therefore without the need of carrying out this adjustment.

The advantages will be apparent from the description and particular emphasis is placed on the economy of the design stage and the manufacturing stage because of the simplification of the molds, the automatic adjustment of the coils in respect of the commutator plates, obviating the need for adjustment of the brush-holders, the checking of the winding which is possible before this winding is molded which allows repairs to be made or unfinished rotors to be discarded, therefore involving less waste.

The invention is not limited to those modes of application nor to those embodiments of its various parts which have been specifically mentioned; on the contrary it encompasses all variants.

I claim:

1. A method of mounting and casting flat rotors of electric motors, comprising the following successive operational steps:

first, angularly positioning within a first mold, an inner tubular casing and a commutator having segments, wherein the angular positioning of said tubular casing in said first mold is performed by at least one indexing finger which is present in said first mold, said at least one indexing finger of said first mold traverses at least one orifice in said inner tubular casing, and another at least one indexing finger goes between said segments of said commutator so as to assure the proper orientation of said commutator in said first mold in relation to said inner tubular casing;

second, pouring a suitable resin into said first mold between said tubular casing and said commutator forming a molded commutator;

third, crimping a winding coil-by-coil onto said molded commutator;

fourth, separating said commutator segments of said molded commutator and windings;

fifth, angularly positioning within a second mold, said molded commutator and windings, wherein the angular positioning of said molded commutator and windings in said second mold is performed by at least one indexing key which is present in said second mold and which fits between said coils to assure proper orientation of said coils in relation to at least one indexing finger in said second mold for positioning said inner tubular casing, whereby said two angular positioning steps ensures correct adjustment of said commutator because said segments of said commutator are correctly positioned with respect to said tubular casing in said first mold and said windings are correctly positioned with respect to said tubular casing in said second mold so that said windings and said commutator segments are correctly positioned with respect to one another; and sixth, pouring suitable resin into said second mold, so as to coat said windings with resin.

* * * * *